(12) United States Patent
Siegel (10) Patent No.: US 8,985,662 B2
(45) Date of Patent: Mar. 24, 2015

(54) FASCIA BOARD FOR RV

(71) Applicant: Kenneth Siegel, Buena Park, CA (US)

(72) Inventor: Kenneth Siegel, Buena Park, CA (US)

(73) Assignee: Trimlok, Inc., Buena Park, CA (US)

( * ) Notice: Subject to any disclaimer, the term of this patent is extended or adjusted under 35 U.S.C. 154(b) by 30 days.

(21) Appl. No.: 13/874,267

(22) Filed: Apr. 30, 2013

(65) Prior Publication Data

US 2013/0285406 A1 Oct. 31, 2013

Related U.S. Application Data

(60) Provisional application No. 61/640,156, filed on Apr. 30, 2012.

(51) Int. Cl.
*B60P 3/34* (2006.01)
*B60R 13/06* (2006.01)

(52) U.S. Cl.
CPC .. *B60R 13/06* (2013.01); *B60P 3/34* (2013.01)
USPC .................... 296/1.08; 296/26.01; 296/26.13; 296/165

(58) Field of Classification Search
USPC ............ 296/1.08, 26.01, 26.09, 26.13, 26.12, 296/165, 171, 172; 52/67; 277/921; 49/476.1, 479.1, 484.1
See application file for complete search history.

(56) References Cited

U.S. PATENT DOCUMENTS

| 5,237,782 | A | * | 8/1993 | Cooper ............................. 52/67 |
|---|---|---|---|---|
| 5,620,224 | A | * | 4/1997 | DiBiagio et al. ............ 296/26.13 |
| 5,785,373 | A | * | 7/1998 | Futrell et al. ................ 296/26.01 |
| 5,788,306 | A | * | 8/1998 | DiBiagio et al. ........... 296/26.02 |
| 6,048,016 | A | * | 4/2000 | Futrell et al. ................ 296/26.13 |
| 6,385,927 | B2 | | 5/2002 | Schiedegger et al. |
| 6,527,324 | B2 | | 3/2003 | McManus et al. |
| 6,735,909 | B1 | | 5/2004 | Gardner |
| 6,854,787 | B2 | * | 2/2005 | Gehman et al. ................ 296/171 |
| 6,966,590 | B1 | * | 11/2005 | Ksiezopolki et al. ....... 296/26.01 |
| 7,540,116 | B1 | * | 6/2009 | Martinson ......................... 52/67 |
| 7,614,676 | B2 | * | 11/2009 | Ksiezopolski et al. .... 296/26.09 |
| 7,614,677 | B2 | * | 11/2009 | Ksiezopolski et al. .... 296/26.09 |
| 7,651,144 | B2 | * | 1/2010 | Clark et al. ................. 296/26.12 |
| 8,016,343 | B2 | * | 9/2011 | Schwindaman et al. ...... 296/171 |
| 8,240,744 | B2 | * | 8/2012 | Schwindaman et al. ...... 296/171 |
| 8,408,625 | B1 | * | 4/2013 | Ksiezopolski et al. .... 296/26.09 |
| 8,480,159 | B2 | * | 7/2013 | Jones ............................ 296/175 |
| 2002/0043813 | A1 | * | 4/2002 | McManus et al. ......... 296/26.13 |
| 2002/0078634 | A1 | * | 6/2002 | McManus et al. ................. 52/67 |
| 2002/0089213 | A1 | * | 7/2002 | Gehman et al. ................ 296/171 |
| 2003/0193213 | A1 | * | 10/2003 | Gehman et al. ................ 296/171 |
| 2006/0117673 | A1 | * | 6/2006 | McManus et al. ................. 52/67 |
| 2008/0116707 | A1 | * | 5/2008 | Boaz et al. .................. 296/26.01 |
| 2010/0083599 | A1 | | 4/2010 | Meulemans |
| 2011/0266829 | A1 | * | 11/2011 | Schwindaman et al. ...... 296/171 |
| 2011/0266830 | A1 | * | 11/2011 | Schwindaman et al. ...... 296/171 |
| 2011/0278873 | A1 | * | 11/2011 | Schwindaman et al. ... 296/26.13 |
| 2012/0032406 | A1 | | 2/2012 | Ksiezopolski et al. |
| 2012/0079771 | A1 | | 4/2012 | Meulemans |
| 2013/0134731 | A1 | * | 5/2013 | Schwindaman et al. ... 296/26.13 |

\* cited by examiner

*Primary Examiner* — Gregory Blankenship
(74) *Attorney, Agent, or Firm* — Cislo & Thomas, LLP (57) ABSTRACT

A cover affixed to an expansion room of a recreational vehicle (RV) to cover and seal a gap in between the expansion room and a wall of the RV. The cover has a transverse wall to attach to the expansion room. The cover may have one or two bulb seals, and/or a flat seal affixed to the cover and/or the transverse wall to improve the seal against the wall of the RV. An end abutting the wall of the RV may be curved towards the RV to further cover the gap. A secondary cover may be used to cover any exposed fasteners. A plurality of covers may be provided so that when the expansion room is against the wall of the RV, the plurality of covers form an attractive covering frame between the RV and the walls of the expansion room.

22 Claims, 5 Drawing Sheets

FASCIA BOARD FOR RV

CROSS-REFERENCE TO RELATED APPLICATION

This patent application claims the benefit of U.S. Provisional Patent Application Ser. No. 61/640,156, entitled "Coex Fascia Board Affixed to an Expansion Room to Provide a Decorative Frame, Gap Cover and Seal, at the Intersection of an Expansion Room and Body of a Recreational Vehicle," filed Apr. 30, 2012, which application is incorporated in its entirety here by this reference.

TECHNICAL FIELD

This invention relates to boards for covering gaps between expansion rooms of a recreational vehicle and the wall of a recreational vehicle.

BACKGROUND

Current fascia boards for RV's are made of extruded powder coated aluminum which have an optional secondary seal within the extruded powder coated aluminum frame. The extruded powder coated aluminum frame is expensive to make and must be made in one piece, thereby increasing the cost of manufacture, assembly and affixation onto the wall of an expansion room of a recreational vehicle. An optional seal made out of cellular sponge material is also affixed to the extruded powder coated aluminum frame.

Because of the strength and durability of the aluminum fascia boards, no one has considered looking for alternatives. However, given the cost of making fascia boards out of aluminum, there is a need for alternatives.

SUMMARY OF THE INVENTION

A first preferred embodiment of the fascia board comprises a frame section made out of plastic, such as thermoplastic olefin ("TPO"), affixed to the expansion room at the location where the expansion room adjoins the recreational vehicle when the expansion room is in the retracted position into the recreational vehicle ("RV"). Each frame section may optionally include a bulb seal made out of a plastic material, such as, by way of example only, a flexible thermoplastic elastomer ("TPE") or thermoplastic vulcanizate ("TPV"), coextruded with the frame section. In any of the embodiments, various components or subcomponents of the fascia board can be made of different or the same material, depending on the characteristics desired for each component, using a coextrusion, tri-extrusion, or in general, a multi-extrusion process. The frame sections of the fascia board may be mitered at their ends to provide an attractive form fit frame, gap cover and seal around the outer wall of the expansion room when the expansion room is retracted back into the RV and the outer wall of the expansion room is adjacent to the wall of the RV. In general, the fascia board provides a gap cover as well as a "seal" when the expansion room is in the closed position. Utilizing the plastic is a great cost saving alternative to aluminum The fascia board comprises a frame section having an exterior wall and an interior wall. The first or upper end of the frame section may terminate in an optional arcuate section which functions as a cover. Spaced apart from the arcuate cover but adjacent to it may be a flexible bulb seal attached to or formed with the interior wall of the fascia board (e.g. by using a coextrusion, tri-extrusion, or, in general, a multi-extrusion process) and running the length of the frame section. Preferably, approximately two-thirds (⅔) of the width of the frame section closer to the lower end or second end, opposite the first end, is a transverse wall extending at approximately ninety (90) degrees to the frame section, the transverse wall having an upper surface and a lower surface, the transverse wall having a set of spaced apart openings. At a location immediately below the transverse wall but on the exterior wall of the frame section may be a first downwardly extending retention member extending for the length of the frame section. Parallel to it on the exterior wall and adjacent to the bottom end of the longitudinal section may be a second upwardly extending lower retention member extending for the length of the frame section. A set of spaced apart openings extend through the location of the frame section between the two retention members.

Preferably, the fascia boards are form fitted with three or four sections affixed to the expansion room to create an attractive gap cover and frame including the flexible bulb seal to also seal the gap area.

At the location of the expansion room, the RV has an opening into and out from which the expansion room slides to provide additional room space. The RV has an exterior wall. The expansion room has an exterior wall with an outer surface, a left sidewall, an upper wall and a right sidewall. By way of example only, the first fascia board is aligned so that the lower surface of the transverse wall rests on the upper wall of the expansion room. A set of fastening members are screwed through openings in the transverse wall and into the upper wall of the expansion room. The interior wall of the fascia board is aligned with the outer wall of the RV so that the bulb seal rests against the outer wall of the RV.

The lower portion of the interior wall of the fascia board rests against the outer surface of the expansion room and a set of fastening members may be screwed through openings of the fascia board and to the upper portion of the exterior surface of the expansion room. A secondary cover or panel may be retained between the retention members to conceal the fastening members.

In the same fashion, a second fascia board is aligned so that the lower surface of the transverse wall rests on a left sidewall of the expansion room. A set of fastening members may be screwed through openings in the transverse wall and into the left sidewall of the expansion room. The interior wall of the fascia board is aligned with the outer wall of the RV so that the bulb seal rests against the outer wall of the RV. The lower portion of the interior wall rests against the outer surface of the expansion room and a set of fastening members may be screwed through openings of the fascia board and to the left side portion of the exterior surface of expansion room. A secondary cover may be retained between the retention members to conceal the fastening members. The adjoining upper portions of two adjacent fascia boards are cut with a miter cut for a flush fit.

In the same fashion, a third fascia board is aligned so that the lower surface of the transverse wall rests on a right sidewall of the expansion room. A set of fastening members is screwed through openings in the transverse wall and into the right sidewall of the expansion room. The interior wall is aligned with the outer wall of the RV so that bulb seal rests against the outer wall of the RV.

The lower portion of the interior wall rests against the outer surface of the expansion room and a set of fastening members may be screwed through the openings of the fascia board and to the right side portion of the exterior surface of the expansion room. A secondary cover or panel is retained between the retention members to conceal the fastening members. The adjoining upper portions of two fascia boards are cut with a miter cut for a flush fit.

In some embodiments, a fourth fascia board may be aligned so that the lower surface of the transverse wall on the side of the second end rests on a bottom wall or floor of the expansion room. A set of fastening members is screwed through openings in the transverse wall and into the bottom wall of the expansion room. Portions of the interior wall of the fascia board may be aligned with the outer wall of the RV so that the bulb seal rests against the outer wall of the RV.

Another portion of the interior wall of the fascia board rests against the outer surface of the expansion room and a set of fastening members may be screwed through the openings of the fascia board and to the bottom portion of the exterior surface of the expansion room. A secondary cover or panel is retained between the retention members to conceal the fastening members. The adjoining portions of two fascia boards are cut with a miter cut for a flush fit.

Therefore, triplicate or quadruplicate fascia boards are affixed to the exterior surface of the expansion room. When the expansion room is retracted the fascia boards form a covering frame which is an attractive frame that also acts as a gap cover and sealing member to conceal the gap between the RV and the outer wall of the expansion room. By having three or four separate fascia boards made out of inexpensive TPO, the frame can be sized to perfectly fit the size of the outer wall of the expansion room.

In some embodiments of the fascia board, a set of fastening members are screwed through openings only in the transverse wall and into a sidewall of an expansion room. The interior wall of the fascia board is aligned with outer wall of RV so that bulb seal rests against outer wall of RV. The lower portion of interior wall rests against a portion of outer surface of expansion room. The fastening members on the exterior frame of the fascia board are eliminated and therefore a secondary cover or panel to conceal them is also eliminated. Three or four fascia boards are used for the frame in the same manner as the first embodiment.

A flat seal, which can be attached to or formed with the fascia board (e.g. by using a coextrusion, tri-extrusion, or, in general, a multi-extrusion process), or be a separate piece of waterproof acrylic foam tape on the underside of the transverse surface, provides more sealing power on the surface to which the transverse wall is affixed. An optional second bulb seal which is attached to or formed with the upper surface of the transverse wall (e.g. by using a coextrusion, tri-extrusion, or, in general, a multi-extrusion process) provides further sealing capability. The flat seal or waterproof tape and second bulb seals are optional and either both can be used or one or the other can be used.

Therefore, three or four fascia boards may be affixed to the exterior surface of the expansion room. When the expansion room is against the outer wall of the RV, they form a covering frame which is an attractive frame and also acts a gap cover and gap seal. By having three or four separate fascia boards made out of inexpensive TPO material, the frame can be sized to perfectly fit the size of the outer wall of the expansion room and this replaces an expensive extruded aluminum frame. By way of example, the seals are preferably made out of TPE or TPV.

In an alternative variation of the present invention, the structure is identical except that the two retention members are replaced with a snap hook and a post supporting a living hinge which supports a secondary cover or panel having a matching snap member which is retained onto the snap hook to act as a covering over the fasteners which affix the fascia board to the secondary cover or panel of the expansion room.

In an additional alternative embodiment, the fascia board has the fastening members, by which the fascia board is attached to the exterior wall, removed and the only fastening members are the fastening members through the transverse wall.

Further novel features and other objects of the present invention will become apparent from the following detailed description, discussion and the appended claims, taken in conjunction with the drawings.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Note, the features in the drawings are not necessarily drawn to scale. Note also, the drawings are illustrative of the various features that can be combined in any variation or combination as described in the specification and not intended to limit any one embodiment to any specific combination of features.

Figure 1A:
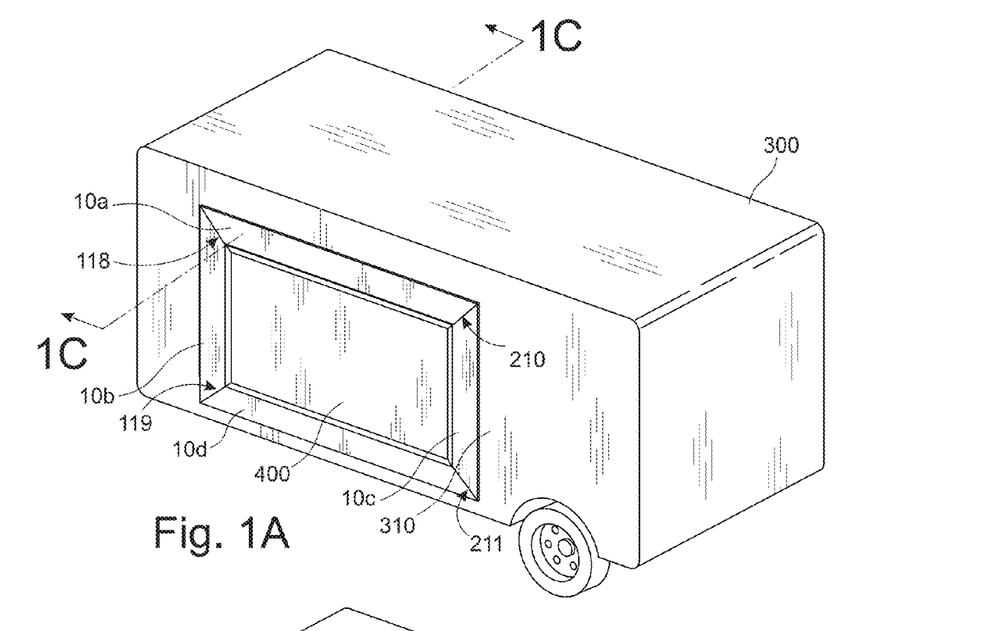
FIG. 1A shows four fascia boards of the present invention installed on a simplified representation of a RV.
Figure 1B:
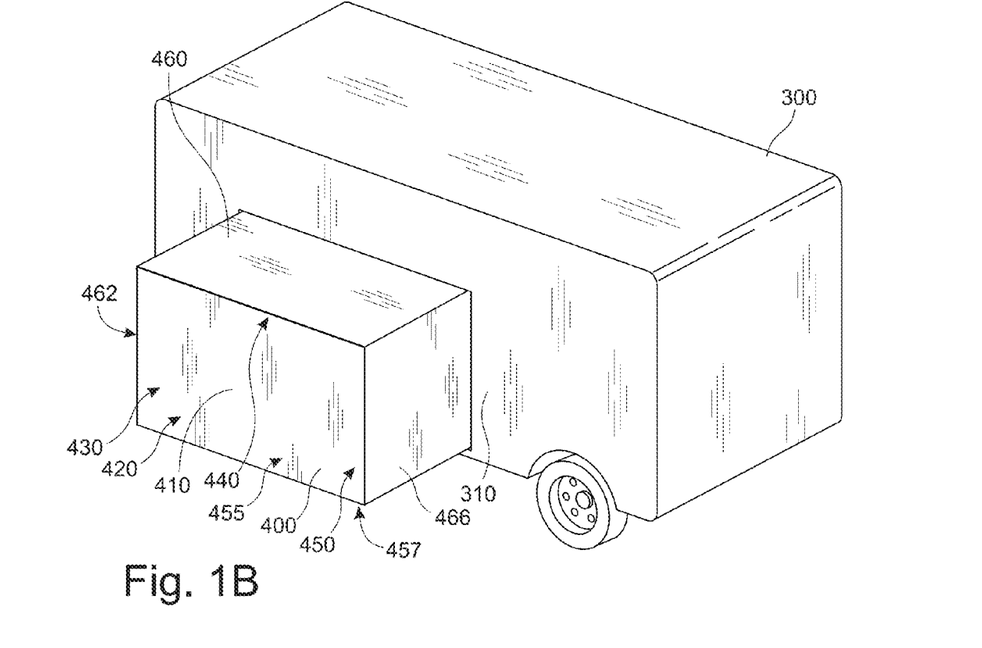
FIG. 1B shows the RV with its expansion room pulled out, and the fascia boards removed.
Figure 1C:
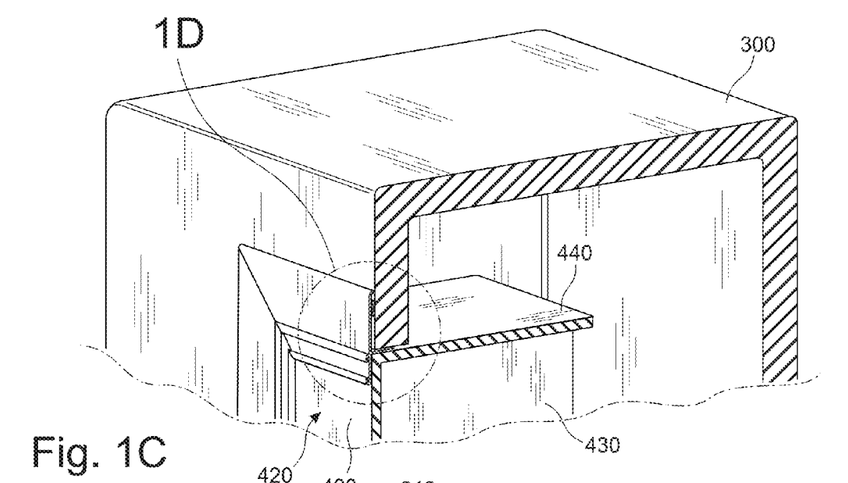
FIG. 1C is a close-up of the cross-section of the RV shown in FIG. 1A taken along line 1C-1C.
Figure 1D:
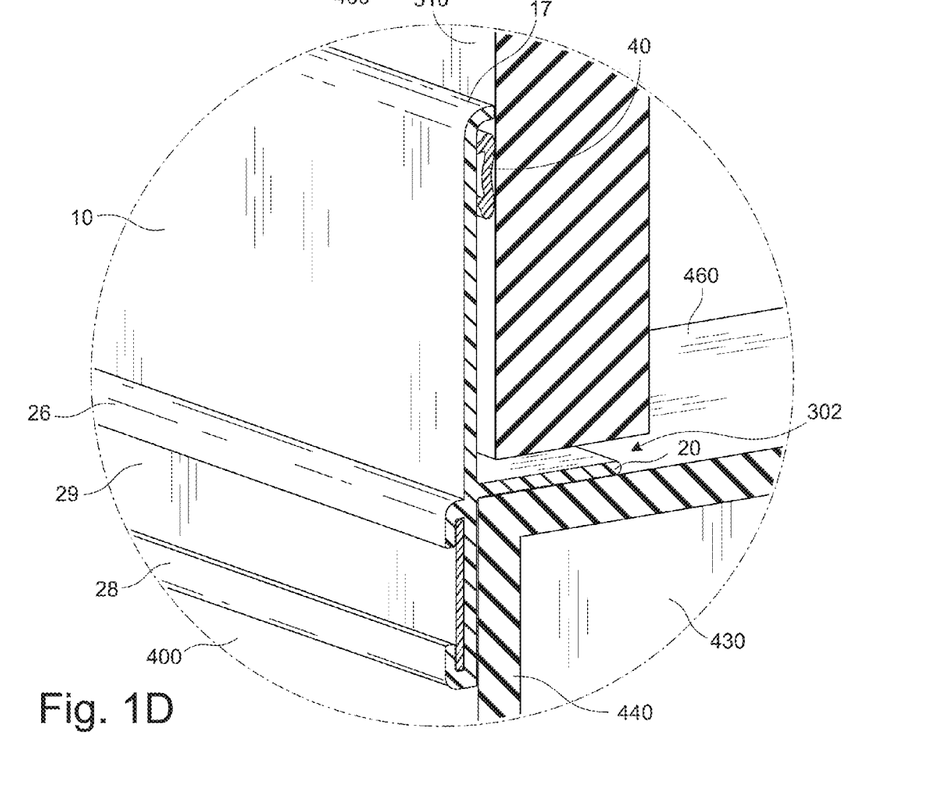
FIG. 1D is a close up of the area identified as 1D in FIG. 1C.

Referring to FIGS. 1A-1D, the fascia board or cover 10 is designed to be installed or affixed to an expansion room 400 of an RV 300 at the location where the expansion room 300 adjoins the RV 300 when the expansion room 400 is in the retracted position into the RV 300. This covers the gap 302 and creates a seal between the expansion room 400 and a wall of the RV 300. As shown in FIG. 1A, sections of the fascia board 10 are mitered 118, 218 to provide an attractive form fit.

Figure 2A:
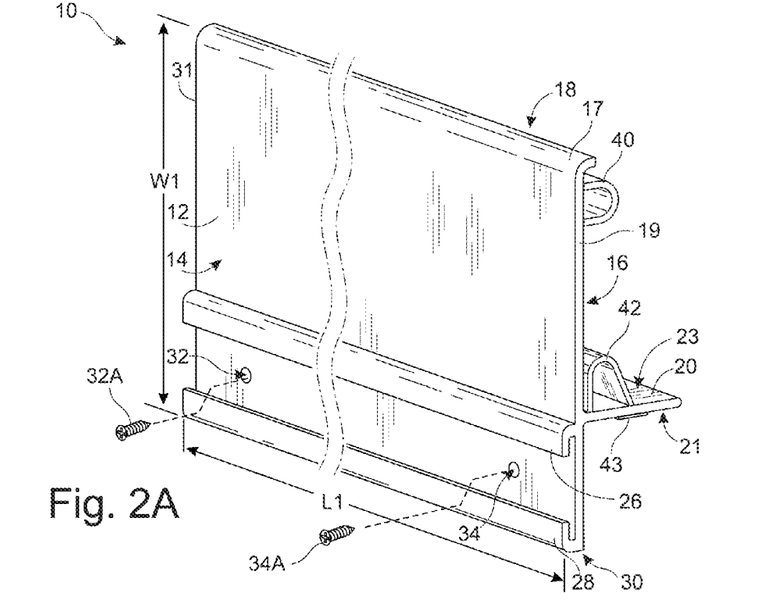
FIG. 2A is a perspective view of the exterior side of an embodiment of the present invention.
Figure 2B:
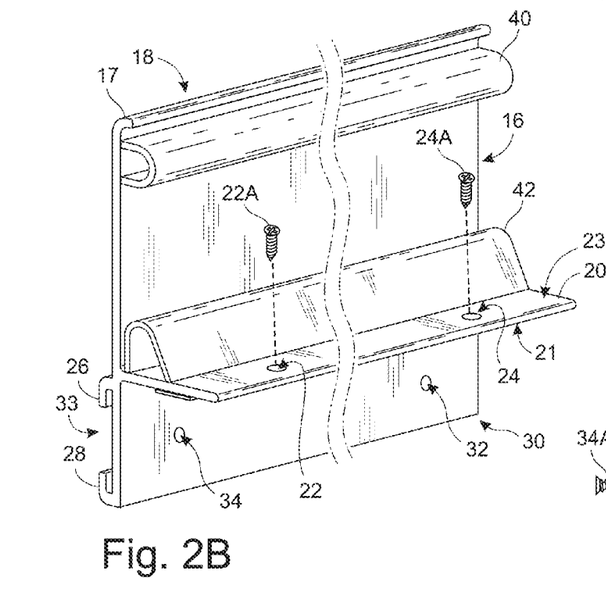
FIG. 2B is a perspective view of the interior side of the embodiment shown in FIG. 2A.
Figure 2C:
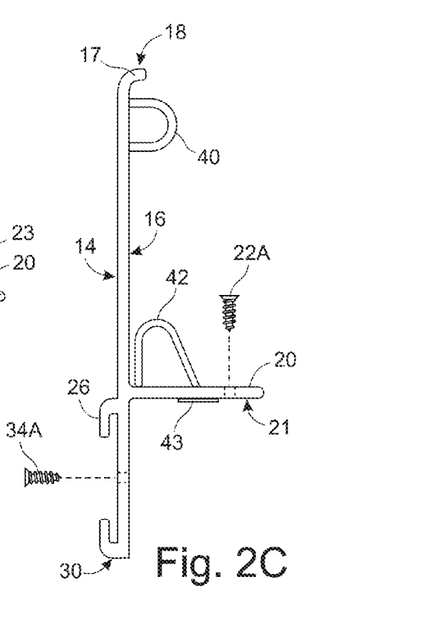
FIG. 2C is a side view of the embodiment shown in FIG. 2A.

Referring to FIGS. 2A through 2C, the first preferred embodiment of the present invention is a fascia board 10 made of plastic or filled plastic. By way of example only, the fascia board may be made of TPO or talc-filled TPO. The fascia board 10 comprises a frame section 12 having an exterior wall 14 and an interior wall 16. The exterior wall 14 and interior wall 16 are bound by a first end 18, a second end 30 opposite the first end 18, a first side 19 adjacent to the first end 18 and the second end 30, and a second side 31 opposite the first side 19 and adjacent to the first end 18 and the second end 30.

In some embodiments, the first end 18 terminates in an arcuate section 17 which enhances the seal against the RV wall. The arcuate section 17 curves inwardly on the side of the interior wall 16 towards the RV wall. This inward curvature causes the arcuate section 17 to cover the contents in between the fascia board 10 and the RV, thereby creating an aesthetic appearance.

In some embodiments, on the interior wall 16, preferably adjacent to the arcuate section 17 is an optional first seal 40. Preferably, the first seal 40 is a flexible bulb seal 40 made of TPE (thermoplastic elastomer) or TPV (thermoplastic vulcanizate). The flexible bulb seal 40 may be attached to or formed with the interior wall 16 and may extend along the entire length L1 of the frame section 12, for example, by a coextrusion, tri-extrusion, or, in general, a multi-extrusion process.

In between the first end 18 and the second end 30 may be a transverse wall 20. In the preferred embodiment, the transverse wall 20 is approximately two-thirds (⅔) of the distance from the first end 18 to the second end 30, closer to the second end 30. However, the transverse wall 20 can be anywhere along the interior wall 16 so long as when the transverse wall is inserted into the gap 302 between the expansion room 400 and the RV wall 310, the portion of the frame section 12 in between the transverse wall 20 and the first end 18 sufficiently covers the gap 302. The transverse wall 20 extends approximately perpendicularly from the interior wall 16 of the frame section 12. The transverse wall 20 has a first surface 21 (or lower surface) and a second surface 23 (or upper surface) opposite the first surface 21. In some embodiments, the transverse wall 20 may have a set of spaced apart openings 22 and 24 that go through the first and second surfaces 21, 23 of the transverse wall 20. Fasteners 22A, 24A can be used to secure the transverse wall 20 to the expansion room 400. Other types of fastening mechanisms can be used to secure the fascia board 10 to the expansion room 400 that may not require pre-formed holes 22, 24. Preferably, the transverse wall 20 extends the full length L1 of the frame section 12.

In some embodiments, at a location immediately below the transverse wall 20 but on the exterior wall 14 of the frame section 12 is a first retention member 26 protruding outwardly and towards the second end 30 in a hook-like fashion. The first retention member 26 need not be immediately below the transverse wall 20. In fact, the first retention member 26 can be positioned anywhere in between the first end 18 and a second retention member 28 described below. The first retention member 26 may extend the full length L1 of the frame section from the first side 19 to the second side 31.

Parallel to the first retention member 26 on the exterior wall 14 in between the second end 30 and the first retention member 26 is a second retention member 28 extending from the first side 19 to the second side 31. Preferably, the second retention member 28 is adjacent to or extends out from the second end 30. The second retention member 28 protrudes outwardly and towards the first retention member 26 in a hook-like fashion. Therefore, in the preferred embodiment, the first retention member 26 and the second retention member 28, in conjunction with the portion of the exterior wall 14 therebetween, define a C-shaped channel 33. In some embodiments, a set of spaced apart openings 32 and 34 extend through the exterior wall 14 and the interior wall 16 of the frame section 12 in between first retention member 26 and second retention member 28. The retention members 26, 28 are optional and some embodiments may not have retention members 26, 28. Fasteners 32A, 34A can be used to secure the frame section 12 to the expansion room 400 via the openings 32, 34. Other types of fasteners can be used as well that may not require pre-formed openings 32, 34.

In some embodiments, a second seal 42, such as a bulb seal, may be attached to the second surface 23 of the transverse wall 20. The second seal 42 is also optional. The second seal 42 may span across the entire length L1 of the transverse wall 20. In some embodiments, a third seal 43 may be attached to the first surface 21 of the transverse wall 20. The third seal 43 may be a flat seal rather than a bulb seal. Like the second seal 42, the third seal 43 may also span across the entire width of the transverse wall 20. The second and third seals 42, 43 may be flexible plastic material attached to or formed with the fascia board 10, such as TPE or TPV. In some embodiments, the third seal 43 may be a waterproof acrylic foam tape on the first side 21 of transverse wall 20 that lends more sealing power on the surface to which the transverse wall 20 is affixed.

In use, by way of example only, four fascia boards 10a, 10b, 10c, 10d are form fitted with four sections affixed to the expansion room 400 to create an attractive fanciful frame. Since the components of the four fascia boards are essentially the same, the same reference numbers will be used in reference to the components. Referring to FIGS. 1A through 1D, at the gap 302 between the expansion room 400 and the RV wall 310, there is an opening into which the expansion room 400 slides in and out to provide additional room space. The RV 300 has an exterior wall 310. The expansion room 400 has an exterior wall 410 with an outer surface 420 having a left wall portion 430, an upper wall portion 440 a right wall portion 450, and a bottom wall portion 455. The expansion room 400 also has an interior top wall 460, a left sidewall 462 adjacent to the top wall 460 and the exterior wall 420, and a right sidewall 466 opposite the left sidewall 462 and adjacent to the top wall 460 and the exterior wall 420, and a bottom wall or floor 457. The first fascia board 10a is aligned so that the first surface 21 of transverse wall 20 rests on top wall 460 of the expansion room 400. A set of fastening members 22A and 24A are screwed through openings 22 and 24 in transverse wall 20 and into top wall 460 of expansion room 400. The portion of the interior wall 16 of the fascia board 10 above the transverse wall 20 is aligned with outer wall 310 of RV 300 so that the first bulb seal 40 rests against the outer wall 310 of RV 300. The lower portion of interior wall 16 rests against the upper wall portion 440 of outer surface 420 of expansion room 400 and a set of fastening members 32A and 34A may be screwed through openings 32 and 34 of the fascia board 10 and to the upper portion 440 of the exterior surface 420 of expansion room 400. A secondary cover or panel 29 may be retained between retention members 26 and 28, if present, to conceal the fastening members 32A and 34A.

In the same fashion, a second fascia board 10b is aligned so that first surface 121 of transverse wall 120 rests on the left sidewall 462 of the expansion room 400. Fastening members 22A, 24A are screwed through openings 22, 24 in the transverse wall 20 and into left sidewall 462 of expansion room 400. The portion of the interior wall 16 above the transverse wall 20 (adjacent the first end 18) is aligned with outer wall 310 of RV 300 so that bulb seal 40 rests against the outer wall 310 of RV 300. The lower portion of interior wall 16 (adjacent the second end 30) rests against the left portion 430 of outer surface 420 of expansion room 400 and a set of fastening members 32A, 34A are screwed through openings 32 and 34 of the fascia board 10b and to the left side portion 430 of the exterior surface 420 of the exterior wall 410 of expansion room 400. A secondary cover or panel 29 may be retained between retention members 26 and 28 to conceal the fastening members 32A and 34A. The adjoining upper portion of fascia boards 10a and 10b are cut with a miter cut 118.

In the same fashion, a third fascia board 10c is aligned so that first surface 21 of the transverse wall 20 rests on a right sidewall 466 of the expansion room 400. A set of fastening members 22A, 24A are screwed through openings in transverse wall 20 and into right sidewall 466 of expansion room 400. The portion of the interior wall 16 above the transverse wall 20 (adjacent to the first end 18) of the fascia board 10c is aligned with outer wall 310 of RV 300 so that bulb seal 40 rests against outer wall 310 of RV 300. The lower portion of interior wall 16 (adjacent the second end 30) rests against the right portion 450 of the outer surface 420 of expansion room 400 and a set of fastening members 32A, 34A are screwed through openings 32, 34 of fascia board 10c and to the right side portion 450 of the exterior surface 420 of expansion room 400. A secondary cover or panel 29 is retained between retention members 26 and 28 to conceal the fastening members. The adjoining upper portions of the two fascia boards 10a and 10c are cut with a miter cut 210.

In the same fashion, a fourth fascia board 10d is aligned so that the first surface 21 of the transverse wall 20 rests on a bottom wall 457 of the expansion room 400. A set of fastening members 22A, 24A may be screwed through openings in transverse wall 20 and into bottom wall 457 of expansion room 400. In some embodiments, a portion of the interior wall 16 adjacent the first end 18 of the fascia board 10d may be aligned with outer wall 310 of RV 300 so that bulb seal 40 rests against outer wall 310 of RV 300. Another portion of interior wall 16 opposite the arcuate section 17 adjacent the second end 30 rests against the bottom wall portion 455 of the outer surface 420 of expansion room 400 and a set of fastening members 32A, 34A are screwed through openings 32, 34 of fascia board 10d and to the bottom wall portion 450 of the exterior surface 420 of expansion room 400. A secondary cover or panel 29 may be retained between retention members 26 and 28 to conceal the fastening members. The adjoining lower portions of the two fascia boards 10b and 10d are cut with a miter cut 119 and adjoining lower portions of the two fascia boards 10c and 10d are cut with a miter cut 211 for a flush fit.

Therefore, in this example, four fascia boards 10a, 10b, 10c, 10d having substantially the same components, are affixed to the exterior 20 surface of the expansion room 400. When the expansion room 400 is against the outer wall 310 of the recreational vehicle, they form a covering frame which is an attractive frame and also acts as a seal. By having four separate fascia boards made out of inexpensive TPO, the frame can be sized to perfectly fit the size of the outer wall of the expansion room. When properly affixed to the expansion room 400, all fascia boards 10a, 10b, 10c, 10d (whether three or four are used) are bound within or coextensive with the borders or edges of the RV wall 310. Therefore, in some embodiments, there may be a space between the border or edge of the RV wall 310 and a fascia board 10a, 10b, 10c, or 10d; or the fascia board 10a, 10b, 10c, or 10d may be flush or nearly flush with the border or edge of the RV wall 310. By way of example only, when four fascia boards 10a, 10b, 10c, 10d are used, all four fascia boards 10a, 10b, 10c, 10d may be bound within the borders or edges of the RV wall 310; thereby creating a space in between the fascia boards 10a, 10b, 10c, 10d and the border or edge of the RV wall 310. By way of another example, when three fascia boards 10a, 10b, 10c are used, the side fascia boards 10b, 10c may extend flush or nearly flush with the bottom end of the RV wall 310, while being well within the bounds of the sides and top of the RV wall 310. Other arrangements and variations can be used depending on the type and style of the expansion room 400 so long as the fascia boards 10a, 10b, 10c, 10d provide an aesthetic frame to cover for the gap between an expansion room 400 and the RV wall 310.

Figure 3A:
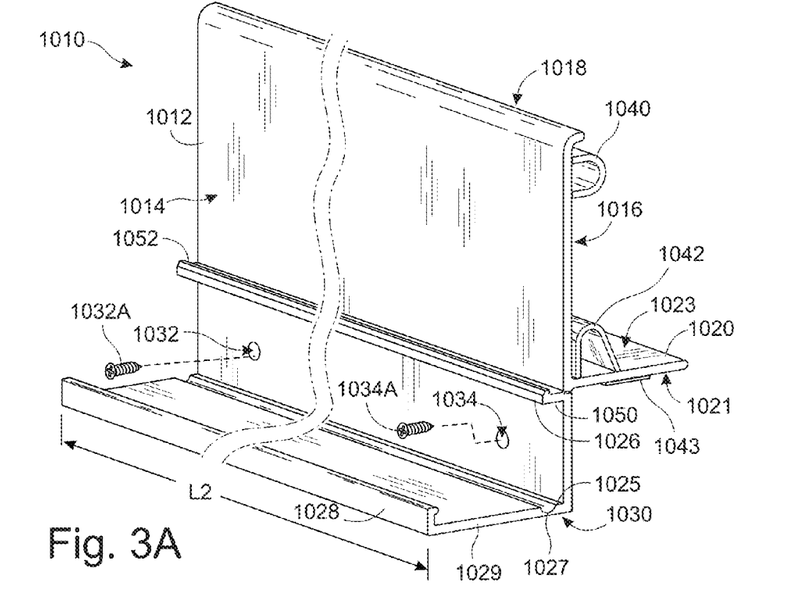
FIG. 3A is a perspective view of the exterior side of another embodiment of the present invention.
Figures 3B, 3C:
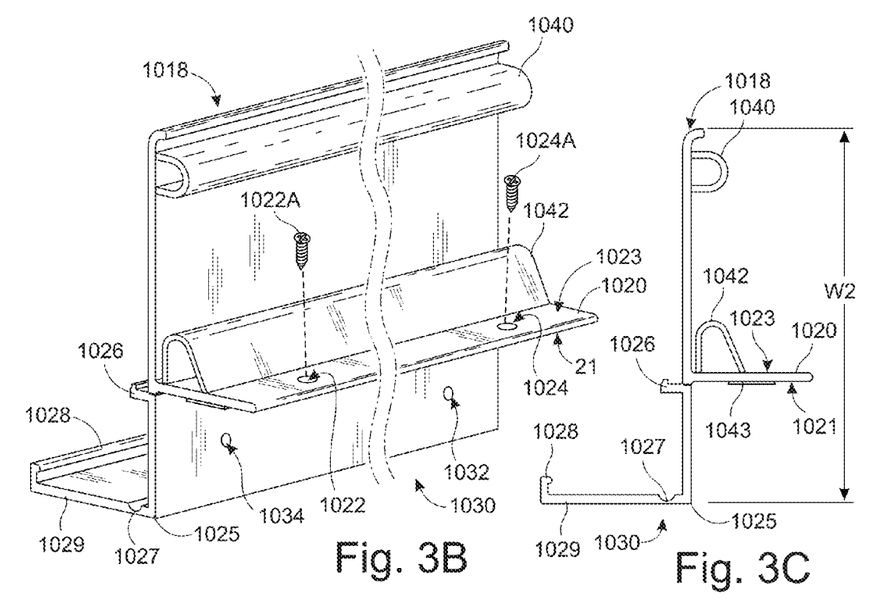
FIG. 3B is a perspective view of the interior side of the embodiment shown in FIG. 3A.
FIG. 3C is a side view of the embodiment shown in FIG. 3A.

Referring to FIGS. 3A-3C, the details of an alternative embodiment of the fascia board 1010 are illustrated. In the preferred embodiment, the sections of the fascia board 1010 are made of plastic, such as rigid TPO material.

Essentially, the fascia board 1010 has the same components, characteristics, and features as the first fascia board embodiment 10, with the exceptions noted below. Therefore, the fascia board 1010 comprises a frame section 1012 having an exterior wall 1014 and an interior wall 1016. The exterior wall 1014 and interior wall 1016 are bound by a first end 1018, a second end 1030 opposite the first end 1018, a first side 1019 adjacent to the first end 1018 and the second end 1030, and a second side 1031 opposite the first side 1019 and adjacent to the first end 1018 and the second end 1030. In some embodiments, the first end 1018 terminates in an optional arcuate section 1017, which functions as a seal against the RV wall 310. Spaced apart from the arcuate section 1017 but adjacent to it is a flexible bulb seal 1040 made of a plastic material, such as TPE or TPV, attached to or formed with the interior wall 1016 and preferably extending the length "L2" of the frame section 1012. Preferably, at approximately two-thirds (⅔) of the width "W2" of the frame section 1012 is a transverse wall 1020 having a first surface 1021 and a second surface 1023, opposite the first surface extending at approximately ninety (90) degrees to the section 1012. However, the transverse wall 1020 can be anywhere along the interior wall 1016 so long as when the transverse wall 1020 is inserted into the gap 302 between the expansion room 400 and the RV wall 310, the portion of the frame section 1012 in between the transverse wall 1020 and the first end 1018 sufficiently covers the gap 302. The transverse wall 1020 may have a set of spaced apart openings 1022 and 1024.

At a location immediately below the transverse wall 1020 but on the exterior wall 1014 of the longitudinal section 1012 is a snap hook retention member 1026 that may extend for the length "L2" of the frame section 1012. The snap hook retention member 1026 comprises a first post 1050 that projects perpendicularly away from the exterior wall 1014, then abruptly turns towards the first end 1018 of the frame section 1012 to create a lip 1052. Parallel to the first post 1050 of the first snap hook retention member 1026, on the exterior wall 1014 and adjacent the second end 1030 of the frame section 1012 is a second post 1025 extending perpendicularly away from the exterior wall 1014 and affixed to a living hinge 1027. The living hinge 1027 is affixed to a secondary cover or panel 1029, which, at the end opposite the living hinge 1027, terminates in a retention member closing hook 1028, all of which may extend for the length "L2" of the frame section 1012. A set of spaced apart openings 1032 and 1034 extend through the location of the frame section 1012 between snap hook retention member 1026 and the post 1025. A secondary cover or panel 1029, attached at one end to the living hinge 1027, comprises a retention member closing hook 1028 which engages the snap hook retention member 1026 to cover the opening 1022 and 1024. The secondary cover or panel 1029 can be bent at the living hinge 1027 (at approximately 90 degrees) so as to make the secondary cover or panel 1029 parallel to the exterior wall 1014. This brings the retention member closing hook 1028 adjacent to the snap hook retention member 1026 so that the secondary cover or panel 1029 can be snapped on to the retention member closing hook 1028. The fascia boards are form fitted with three or four sections affixed to the expansion room to create an attractive fanciful frame.

A flat seal 1043 made of plastic, such as TPE or TPV, may be attached to or formed with the fascia board 1010 on the first surface 1021 of the transverse wall 1020, or a waterproof acrylic foam tape may be applied on the first surface 1021 of transverse wall 1020 to lend more sealing power on the surface to which the transverse wall 1020 is affixed. A second bulb seal 1042 made of plastic, such as TPE or TPV, may be attached to or formed with or affixed to the second surface 1023 of the transverse wall 1020 to provide further sealing capability.

Figure 4A:
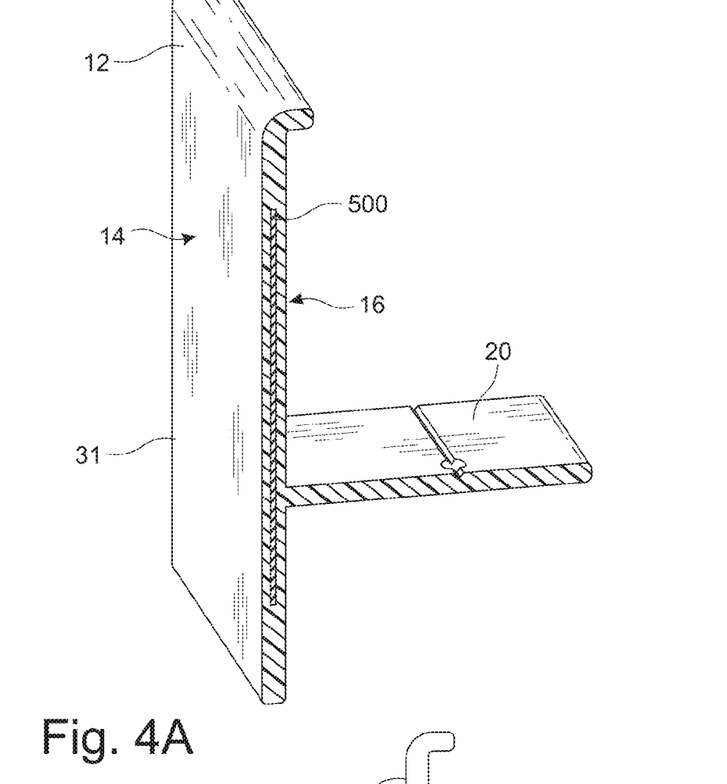
FIG. 4A is a cross-sectional view of another embodiment of the present invention.
Figure 4B:
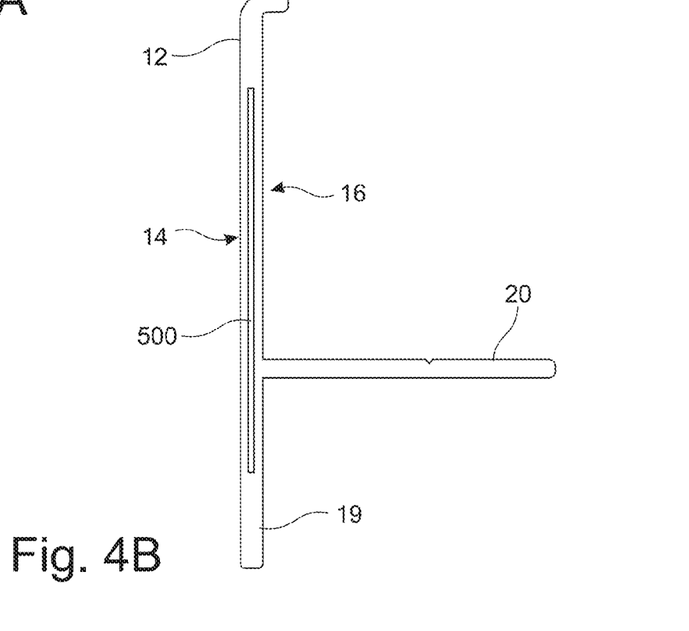
FIG. 4B is a side view of the embodiment shown in FIG. 4A.

In any of the aforementioned embodiments (but described here in reference to the first embodiment for ease of description only), the frame section 12 may further comprise a support 500, as shown in FIGS. 4A and 4B. The support 500 may be integrated in between the interior wall 16 and the exterior wall 14. In some embodiments, the support may extend the full length L1 of the section 12 from the first end 18 to the second end 30. In some embodiments, the support 500 may extend a partial length L1 of the section 12. Similarly, the support may extend the full width W1 of the section 12 from the first side 19 to the second side 31, or the support 500 may extend a partial width W1 of the section 12. The support 500 can be made of any type of rigid material, for example, plastic, wood, metal, carbon fiber, any composite, and any combination thereof. In the preferred embodiment, the support 500 is made of aluminum In the preferred embodiment, the materials used may be various different types of plastic, filled plastic, or rubber, such as thermoplastic olefin, talc-filled thermoplastic olefin, thermoplastic elastomer, thermoplastic rubber, vulcanized rubber, and the like, or any combination thereof. The components and subcomponents may be created by a coextrusion, a tri-extrusion, or in general, a multi-extrusion process. By utilizing these multi-extrusion processes to make components and subcomponents of the same or different material, the manufacturer can fine tune the fascia board by utilizing the best type of material for the purpose intended for each component or subcomponent depending on the desired characteristics needed for those components or subcomponents, such as rigidity, flexibility, hardness, softness, and the like.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A cover to conceal the gap between an outer wall of an expansion room and a wall of a recreational vehicle, comprising:
   a. a frame section having an exterior wall and an interior wall, the exterior wall and interior wall by a first end, a second end opposite the first end, a first side adjacent to the first end and the second end, and a second side of opposite the first side and adjacent to the first end and the second end, wherein the first end terminates in an arcuate section, the arcuate section curving inwardly towards the interior wall, wherein the frame section is made of thermoplastic olefin:
   b. a flexible bulb seal on the interior wall adjacent to the arcuate section, wherein the flexible bulb seal is made of thermoplastic elastomer;
   c. a transverse wall between the first end and the second end, the transverse wall located in between the first end and the second end, closer to the second end, the transverse wall extending approximately perpendicularly from the interior wall, the transverse wall having a first surface and a second surface opposite the first surface, and a first set of spaced apart openings through the first and second surfaces;
   d. a first retention member protruding outwardly and towards the second end, the first retention member located below the transverse wall but on the exterior wall;
   e. a second retention member positioned on the exterior wall and adjacent to the second end of the frame section, the second retention member protruding outwardly and towards the first retention member, the first retention member and the second retention member, in conjunction with the exterior wall, defining a C-shaped channel;
   f. a second set of spaced apart openings between first retention member and second retention member;
   g. a secondary cover insertable into the C-shaped channel; and
   h. an aluminum support integrated into the frame section in between the interior wall and the exterior wall.

2. The cover of claim 1, further comprising a flat seal on the first surface of the transverse wall.

3. A cover to conceal the gap between an outer wall of an expansion room and wall of recreational vehicle, comprising:
   a. a frame section having an exterior wall and an interior wall, the exterior wall and interior wall bound by a first end, a second end opposite the first end, a first side adjacent to the first end and the second end, and a second side opposite the first side and adjacent to the first end and the second end, wherein the first end terminates in an arcuate section, the arcuate section curving inwardly towards the interior wall, wherein the frame section is made of thermoplastic olefin;
   b. a flexible bulb seal on the interior wall adjacent to the arcuate section, wherein the flexible bulb seal is made of thermoplastic elastomer;
   c. a transverse wall in between the first end and the second end, the transverse wall located in between the first end and the second end, closer to the second end, the transverse wall extending approximately perpendicularly from the interior wall, the transverse wall having a first surface and a second surface opposite the first surface, and a first set of spaced apart openings through the first and second surfaces;
   d. a first retention member protruding outwardly and towards the second end, the first retention member located below the transverse wall but on the exterior wall;
   e. a second retention member positioned on the exterior wall and adjacent to the second end of the frame section, the second retention member protruding outwardly and towards the first retention member, the first retention member and the second retention member, in conjunction with the exterior wall, defining a C-shaped channel;
   f. a second set of spaced apart openings between first retention member and second retention member;
   g. a second cover insertabie into the C-shaped channel; and h. a second bulb seal on the second surface of the transverse wall.

4. A cover for use with an expansion room of a recreational vehicle, comprising:
   a. a frame section having an exterior wall and an interior the exterior wall and interior wall bound by a first end, a second end opposite the first end, a first side adjacent to the first end and the second end, and a second side opposite the first side and adjacent to the first end and the second end, wherein the frame section is made of a first plastic material; and
   b. a transverse wall in between the first end and the second end, the transverse wall extending approximately perpendicularly from the interior wall of the frame section, the transverse wall having a first surface and a second surface opposite the first surface; and
   c. a support integrated into the frame section in between the interior wall and the exterior wall.

5. The cover of claim 4, wherein the frame section is made of thermoplastic olefin.

6. The cover of claim 4, wherein the first end of the frame section terminates in an arcuate section curving inwardly towards the interior wall.

7. The cover of claim 4, further comprising a bulb seal on the interior wall adjacent to the first end, wherein the bulb seal is made of a second plastic material.

8. The cover of claim 7, wherein the second plastic material is a thermoplastic elastomer.

9. The cover of claim 4, further comprising a secondary cover configured to attach to the frame section.

10. The cover of claim 9, further comprising
   a. a first retention member on the exterior wall, the first retention member protruding outwardly and towards the second end of the frame section, the first retention member extending from the first side to the second side; and
   b. a second retention member extending from the first side to the second side, and positioned on the exterior wall and adjacent the second end of the frame section, the first retention member and the second retention member, in conjunction with the exterior wall, defining a C-shaped channel into which the secondary cover can be inserted.

11. The cover of claim 4, further comprising a flat seal on the first surface of the transverse wall.

12. The cover of claim 5 further comprising a bulb seal on the second surface of the transverse wall.

13. The cover of claim 12 further comprising a secondary cover attached to the second end of the frame section by a living hinge.

14. The cover of claim 13 further comprising a flat seal on the first surface of the transverse wall.

15. A cover for use with an expansion recreational vehicle, comprising:
   a. a frame section exterior wall and an interior, the exterior wall and interior wall bound by a first end, a second end opposite the first end, a first side adjacent to the first end and the second end, and a second side opposite the first side and adjacent to the first end and the second end, wherein the frame section is made of first plastic material; and
   b. a transverse wall in between the first end and the second end, the transverse wall extending approximately perpendicularly from the interior wall of the frame section, the transverse wall having a first surface and a second surface opposite the first surface; and
   c. a bulb seal on the second surface of the transverse wall, wherein the bulb seal is made of a second plastic material.

16. A cover for use with an expansion room of a recreational vehicle, comprising:
   a. a frame section having an exterior wall and an interior wall, the exterior wall and interior wall bound by a first end, a second end opposite the first end, a first side adjacent to the first end and the second end, and a second side opposite the first side and adjacent to the first end and the second end, wherein the frame section is made of a first plastic material;
   b. a transverse wall in between the first end and the second end, the transverse wall extending approximately perpendicularly from the interior wall of the frame section, the transverse wall having a first surface and a second surface opposite the first surface; and
   c. a secondary cover attached to the second end of the frame section by a living hinge.

17. The cover of claim 16, wherein the frame section is made of thermoplastic olefin.

18. The cover of claim 16, further comprising an aluminum support integrated into the section in between the interior wall and the exterior wall.

19. The cover of claim 16, wherein the first end terminates in an arcuate section curving inwardly in a direction of the interior wall.

20. The cover of claim 16, further comprising a bulb seal on the interior wall adjacent to the first end, wherein the bulb seal is made of a second plastic material.

21. The cover of claim 16, further comprising a bulb seal on the second surface of the transverse wall, wherein the bulb seal is made of a second plastic material.

22. The cover of claim 16, further comprising a flat seal on the first surface of the transverse wall.

* * * * *